(12) United States Patent
Blackwell et al.

(10) Patent No.: US 10,883,024 B2
(45) Date of Patent: Jan. 5, 2021

(54) ADHESIVE ACRYLATE-OLEFIN COPOLYMERS, METHODS FOR PRODUCING SAME AND COMPOSITIONS UTILIZING SAME

(71) Applicant: Avery Dennison Corporation, Glendale, CA (US)

(72) Inventors: Christopher J. Blackwell, Garrettsville, OH (US); James P. Akeley, Mill Hall, PA (US); Kenneth J. Wolfe, Bellwood, PA (US); Mitch J. Rackovan, Madison, OH (US); Karen L. Karbacka, Perry, OH (US); Tamara L. McCartney, Stow, OH (US); Ajay S. Desai, Concord Township, OH (US); Sara E. Porosky, Stow, OH (US)

(73) Assignee: Avery Dennison Corporation, Glendale, CA (US)

( * ) Notice: Subject to any disclaimer, the term of this patent is extended or adjusted under 35 U.S.C. 154(b) by 131 days.

(21) Appl. No.: 15/245,373

(22) Filed: Aug. 24, 2016

(65) Prior Publication Data

US 2017/0081558 A1    Mar. 23, 2017

Related U.S. Application Data

(63) Continuation of application No. 13/600,313, filed on Aug. 31, 2012, now abandoned.
(Continued)

(51) Int. Cl.
*C09J 133/08* (2006.01)
*C09J 133/12* (2006.01)
(Continued)

(52) U.S. Cl.
CPC ............ *C09J 133/12* (2013.01); *C08K 5/053* (2013.01); *C09J 7/22* (2018.01); *C09J 7/243* (2018.01);
(Continued)

(58) Field of Classification Search
None
See application file for complete search history.

(56) References Cited

U.S. PATENT DOCUMENTS 3,763,771 A    10/1973    McKenna, Jr. et al.
4,258,104 A     3/1981    Lee et al.
(Continued)

FOREIGN PATENT DOCUMENTS

CN    1083085       3/1994
CN    101053004     1/2012
(Continued)

OTHER PUBLICATIONS

Machine translation of JP 2000296588 A (2000).*
(Continued)

*Primary Examiner* — Frank D Ducheneaux (57) ABSTRACT

The present invention relates to an adhesive compositions, facestocks and/or packaging labels containing same, where such compositions, facestocks and/or labels are designed to facilitate the recyclability of a plastic article formed from any suitable polymer or mixture of polymers (e.g., a polyethylene terephthalate (PET), high density polyethylene (HDPE), polyvinyl chloride (PVC), low density polyethylene (LDPE), polypropylene (PP), polystyrene (PS), or others of all plastic types), or even glass bottles. In another embodiment, the present invention relates to a method for removing an adhesive composition, facestock and/or packaging label containing same, from a plastic article that is to be recycled.

17 Claims, 4 Drawing Sheets

Related U.S. Application Data (60) Provisional application No. 61/529,897, filed on Aug. 31, 2011.

(51) Int. Cl.

| | | |
|---|---|---|
| *C09J 7/22* | (2018.01) | |
| *C09J 7/38* | (2018.01) | |
| *C09J 129/04* | (2006.01) | |
| *C08K 5/053* | (2006.01) | |
| *G09F 3/00* | (2006.01) | |
| *G09F 3/02* | (2006.01) | |
| *G09F 3/10* | (2006.01) | |
| *C09J 7/24* | (2018.01) | |
| *C09J 133/06* | (2006.01) | |

(52) U.S. Cl.
CPC ............ *C09J 7/385* (2018.01); *C09J 129/04* (2013.01); *C09J 133/064* (2013.01); *C09J 133/08* (2013.01); *G09F 3/00* (2013.01); *C09J 2203/334* (2013.01); *C09J 2301/302* (2020.08); *C09J 2301/408* (2020.08); *C09J 2423/006* (2013.01); *C09J 2425/006* (2013.01); *C09J 2429/00* (2013.01); *C09J 2433/00* (2013.01); *C09J 2467/006* (2013.01); *G09F 3/02* (2013.01); *G09F 3/10* (2013.01); *Y02P 20/582* (2015.11); *Y10T 156/1111* (2015.01); *Y10T 428/254* (2015.01); *Y10T 428/28* (2015.01); *Y10T 428/2857* (2015.01); *Y10T 428/2883* (2015.01); *Y10T 428/2891* (2015.01)

(56) References Cited

U.S. PATENT DOCUMENTS

| | | |
|---|---|---|
| 4,278,727 A | 7/1981 | Brabetz et al. |
| 4,440,884 A | 4/1984 | Jannusch |
| 4,956,033 A | 9/1990 | Martin et al. |
| 5,143,308 A | 9/1992 | Hally et al. |
| 5,164,444 A | 11/1992 | Bernard |
| 5,183,459 A | 2/1993 | Bernard |
| 5,183,841 A | 2/1993 | Bernard |
| 5,189,126 A | 2/1993 | Bernard |
| 5,264,532 A | 11/1993 | Bernard |
| 5,278,227 A | 1/1994 | Bernard |
| 5,385,965 A | 1/1995 | Bernard et al. |
| 5,502,089 A * | 3/1996 | Bricker ............... C08F 8/44 524/155 |
| 5,554,657 A | 9/1996 | Brownscornbe et al. |
| 5,635,584 A | 6/1997 | Ekart et al. |
| 5,792,536 A | 8/1998 | Whipp |
| 6,224,974 B1 | 5/2001 | Wuu |
| 6,663,929 B1 | 12/2003 | Tabota et al. |
| 6,680,097 B1 | 1/2004 | Arnberger et al. |
| 7,947,350 B2 | 5/2011 | Lavosky |
| 8,020,359 B2 | 9/2011 | Mattos, Jr. et al. |
| 2001/0003765 A1 | 6/2001 | Mallya et al. |
| 2004/0219321 A1 | 11/2004 | Sguier et al. |
| 2005/0266191 A1 | 12/2005 | Hama et al. |
| 2007/0166501 A1 | 7/2007 | Seitz et al. |
| 2009/0234034 A1 | 9/2009 | Blanco |
| 2010/0051200 A1 | 3/2010 | Mueller et al. |
| 2010/0255228 A1 | 10/2010 | Dougherty et al. |
| 2010/0313667 A1 * | 12/2010 | Terada ............... B32B 27/18 73/754 |

FOREIGN PATENT DOCUMENTS

| | | |
|---|---|---|
| CN | 101563432 | 12/2014 |
| EP | 0739912 | 7/1999 |
| GB | 127877 | 6/1972 |
| JP | 11-241053 | 9/1999 |
| JP | 2000-296588 | 10/2000 |
| KR | 10-0255497 | 5/2000 |
| WO | 93/13181 | 7/1993 |
| WO | 99/19415 | 4/1999 |
| WO | 2010/115564 | 10/2010 |
| WO | 2010/117774 | 10/2010 |

OTHER PUBLICATIONS

Zhou et al, "Materials for manufacturing pens," China Light Industry Press, 1st Edition, edited in Mar. 2007, p. 243.

Kardashov et al., "Manufacturing Process for Honeycomb, Layered and Composite Compounds, Honeycomb Structures," Polymer Adhesives, Production and Use, pp. 183-190, 1983.

Trizno et al., "Formation of an Adhesive Layer," Adhesive and Bonding, pp. 63-71, 1980.

International Search Report and Written Opinion dated Mar. 6, 2013 issued in corresponding IA No. PCT/US2012/053265 filed Aug. 31, 2012.

International Preliminary Report on Patentability dated Mar. 4, 2014 issued in corresponding IA No. PCT/US2012/053265 filed Aug. 31. 2012.

"Protocol for Evaluating PET Thermoform Labels and Adhesives for Compatibility with PET Recycling," http://www.plasticsrecycling.org/images/pdf/PET-Resins/PET-Thermoforms/Protocol_Evaluating_PET_Thermoform_Labels_Adhesives_Compatibility_PET.pdf, 15 pages, Feb. 8, 2011.

* cited by examiner

ADHESIVE ACRYLATE-OLEFIN COPOLYMERS, METHODS FOR PRODUCING SAME AND COMPOSITIONS UTILIZING SAME

CROSS-REFERENCE TO RELATED APPLICATION

The present application is a continuation of U.S. patent application Ser. No. 13/600,313 filed Aug. 31, 2012 and claims the benefit of U.S. Provisional Patent Application No. 61/529,897 filed Aug. 31, 2011, which are incorporated herein by reference in their entireties.

FIELD

The present invention relates to an adhesive compositions, facestocks and/or packaging labels containing same, where such compositions, facestocks and/or labels are designed to facilitate the recyclability of a plastic article formed from any suitable polymer or mixture of polymers (e.g., a polyethylene terephthalate (PET), high density polyethylene (HDPE), polyvinyl chloride (PVC), low density polyethylene (LDPE), polypropylene (PP), polystyrene (PS), or others of all plastic types), or even glass bottles. In another embodiment, the present invention relates to a method for removing an adhesive composition, facestock and/or packaging label containing same, from a plastic article that is to be recycled.

BACKGROUND

In recent years, the use of polymer packaging articles, particularly those made of thermoplastic polymers has been increasing year after year because of their excellent resistance to breakage, lightweight properties, and transparency as compared with conventional bottles made of glass, metals, or other materials. In particular, the conversion from conventional packaging articles to polymer packaging articles has progressed most rapidly in the beverage industry where plastic, or polymer, packaging articles are used in great quantity. Although not limited thereto, one of the most popular polymer compositions for use in polymer, or plastic, packaging articles is polyethylene terephthalate (PET).

In light of the above, great interest has recently arisen in the recycling of a wide range of plastic, or polymer, packaging articles. Given this, there is currently real interest in various solutions that would, if obtained, make the recycling of plastic packaging articles for more efficient and cost effective.

For example, much attention has been paid to the recycling of bottles or thermoform containers made of thermoplastic polymers, particularly PET, and even glass. In general, PET bottles are fitted with various labels, for example, stretch labels made of polyolefins; heat-shrinkable labels made of polyesters, polystyrene, polyvinyl chloride, or other polymers; and tack labels made of polypropylene or other polymers. In recycling PET bottles, such bottles are usually collected from general consumers without removal of their labels, and then brought to, for example, recycling centers. These bottles are then washed, and their labels are removed by primary crushing, at which time, however, the crushed polymer materials may still include portion of the labels, facestocks, or adhesive used to attach same in great quantity. Therefore, the conversion of PET bottles into recycled polymer pellets almost always requires many intervening steps such as secondary crushing, specific gravity separation of labels in a liquid, dehydration and drying, specific gravity separation of labels by air blowing, and pelletization.

As such, it is often difficult, if not impossible; to remove a large enough amount of the facestock, label and/or adhesive material from the polymer, or plastic, article to be recycled. Accordingly, there is a need in the art for an improved adhesive, facestock and/or label that when used in conjunction with a polymer-based, or plastic-based, packaging article would permit a more efficient and cost-effective recycling process to be utilized to recycle the desired plastic, or polymer, article.

SUMMARY

The present invention relates to an adhesive compositions, facestocks and/or packaging labels containing same, where such compositions, facestocks and/or labels are designed to facilitate the recyclability of a plastic article formed from any suitable polymer or mixture of polymers (e.g., a polyethylene terephthalate (PET), high density polyethylene (HDPE), polyvinyl chloride (PVC), low density polyethylene (LDPE), polypropylene (PP), polystyrene (PS), or others of all plastic types), or even glass bottles. In another embodiment, the present invention relates to a method for removing an adhesive composition, facestock and/or packaging label containing same, from a plastic article that is to be recycled.

In one embodiment, the present invention relates to a facestock/adhesive construction for a plastic, glass, cardboard, or metal article comprising: a face layer, wherein the face layer is formed from a facestock material selected from paper facestocks, olefin polymer facestocks, polystyrene facestocks, or PET facestocks; and an adhesive layer, wherein the facestock is able to be removed from a plastic, glass, cardboard, or metal article in a manner that enables recycling of the plastic, glass, cardboard, or metal article.

In one embodiment, the present invention relates to a method of removing the facestock/adhesive constructions disclosed herein, wherein the method comprises the steps of: (a) supplying at least one article to be later recycled, the article having attached thereto at least one facestock/adhesive construction according to any one of the facestock/adhesive constructions disclosed herein; and (b) subjecting the article containing the at least one facestock/adhesive construction to at least one caustic solution until the facestock/adhesive construction releases from the article to be recycled.

In still another embodiment, the present invention relates to a method that further comprises the steps of: (c) separating the removed one or more facestock/adhesive construction from the article to be recycled; and (d) optionally washing the article to be recycled to remove any remaining caustic solution prior to further recycling steps.

In still another embodiment, the present invention relates to a facestock/adhesive construction, or packaging label, for a plastic article comprising: a face layer; and an adhesive layer, wherein the facestock is able to be removed from a plastic article in a manner that enables recycling of the plastic article.

In still another embodiment, the present invention relates to a facestock/adhesive construction or label for a plastic, or glass, article as shown and/or described herein.

In still another embodiment, the present invention relates to a method for removing a facestock/adhesive construction or label from a plastic, or glass, article in order to facilitate recycling of the plastic, or glass, article as shown and/or described herein.

In still yet another embodiment, the present invention relates to an adhesive composition as shown and/or described herein for use in conjunction with a label, or print, layer in a facestock, wherein the adhesive composition is designed to be removable from a plastic, or glass, article without adversely affecting the ability of the plastic, or glass, article to be recycled.

DETAILED DESCRIPTION OF THE INVENTION

The present invention relates to an adhesive compositions, facestocks and/or packaging labels containing same, where such compositions, facestocks and/or labels are designed to facilitate the recyclability of a plastic article formed from any suitable polymer or mixture of polymers (e.g., a polyethylene terephthalate (PET), high density polyethylene (HDPE), polyvinyl chloride (PVC), low density polyethylene (LDPE), polypropylene (PP), polystyrene (PS), or others of all plastic types), or even glass bottles. In another embodiment, the present invention relates to a method for removing an adhesive composition, facestock and/or packaging label containing same, from a plastic article that is to be recycled.

Although not limited thereto, there are various types of polyethylene terephthalates (PETs) where recycling thereof is of interest. For example, such PETs include, but are not limited to, low or high intrinsic viscosity PET, amorphous PET (A-PET), un-oriented and oriented PET, and crystalized PET. As such, the present invention utilizes an adhesive composition that is compatible with both the underlying polymer, or plastic, compound of the polymer, or plastic, packaging article and compatible with the backmost facing layer of the facestock and/or label that is to be applied to the polymer, or plastic, packaging article. In still another embodiment, the present invention utilizes an adhesive composition that is both compatible with the underlying a glass article and compatible with the backmost facing layer of the facestock and/or label that is to be applied to the glass article. Given this, the present invention will be described in relation to a plastic, or polymer, article. However, the present invention has applicability to articles formed from glass, cardboard and/or metal as well.

In one embodiment, the present invention is directed to an adhesive composition that when utilized in conjunction with a facestock and/or label on a polymer, or plastic, packaging article permits the efficient and cost effective recycling of the polymer, or plastic, packaging article. As would be apparent to those of skill in the art, the polymer, or plastic, packaging article can be any type of article including, but not limited to, bottles, containers, clam shell containers, flexible packaging containers, food containers, non-food item containers, etc. It may also have applicability in non-plastic containers such as cardboard, glass and/or metal.

In one embodiment, any adhesive composition that can be readily dissolved, dissociated, or causes the adhesive composition to release from an underlying polymer, or plastic, surface can be utilized in conjunction with the present invention. In one embodiment, the adhesive utilized in conjunction with the present invention has sufficient adhesion at both cold and warm temperatures. As noted above, the adhesive composition utilized in conjunction with the present invention should possess compatibility with the underlying polymer, or plastic, compound of the polymer, or plastic, packaging article as well as with the backmost facing layer of the facestock and/or label that is to be applied to the polymer, or plastic, packaging article.

In one embodiment, the adhesive compound selected for use in conjunction with the present invention leaves no residue on the plastic surface that would require one or more further processing steps to remove such residue from the surface of the polymer, or plastic, packaging article prior to the recycling thereof.

In one embodiment, a suitable adhesive is selected from suitable tacky acrylic emulsion adhesive polymers that possess excellent adhesion to a wide variety of surfaces, including a wide range of polymer surfaces as well as non-polymer surfaces (e.g., stainless steel and corrugated board). Moreover, the emulsion adhesive polymers of this embodiment possess excellent cohesion and adhesion at low temperatures and, when part of a laminate stock such as pressure-sensitive adhesive label stock, provide excellent high-speed converting characteristics such as die cutting, matrix stripping and fan folding.

In one embodiment, a suitable tacky, emulsion pressure-sensitive adhesive polymer of the present invention comprise, on a polymerized basis and based on the total weight of the polymer, at least one alkyl acrylate containing from about 4 to about 8 carbon atoms in the alkyl group (e.g., 2-ethyl hexyl acrylate), the alkyl acrylate present in a total amount of from about 35 weight percent to about 60 weight percent; at least one vinyl ester containing from 2 to about 16 carbon atoms in the alkyl chain of the acid (e.g., vinyl acetate), the vinyl ester present in a total amount of from about 15 weight percent to about 35 weight percent; at least one diester of a dicarboxylic acid wherein each alkyl group of the diester independently contains from about 6 to about 12 carbon atoms (e.g., di-2-ethyl hexyl maleate or di-2-ethyl hexyl fumarate), the diesters being present in a total amount of from about 20 to about 40 weight percent; up to about 5 weight percent, or even about 1 to about 3 weight percent, of an unsaturated carboxylic acid containing from 3 to about 5 carbon atoms (e.g., acrylic and/or methacrylic acid), the emulsion polymer having a glass transition temperature of less than about $-30°$ C. and a gel content of from about 50 to about 70 weight percent of the polymer.

The monomer proportions of such emulsion pressure-sensitive adhesive polymer compositions can be adjusted in such a way that the adhesive has a glass transition temperature less than about $-30°$ C., or even less than about $-34°$ C., yielding a good balance of adhesion and tack at room temperature and low temperatures. The emulsion polymers of the present invention have a very broad glass transition temperature range.

In one embodiment, additional suitable emulsion polymers for use as an adhesive in the present invention are disclosed in U.S. Pat. Nos. 5,164,444; 5,183,459; 5,189,126;

5,264,532; 5,278,227, the complete disclosures of which are incorporated in their entireties herein.

In another embodiment, a suitable adhesive for the present invention is a copolymer composition formed via an emulsion process from a mixture of reactants comprising at least one alkyl acrylate ester of an alcohol containing at least 4 carbon atoms in the alkyl chain, at least one polar monomer and at least one copolymerizable monomer selected from methyl acrylate, MMA, EA, VAc, and combinations of two or more thereof, wherein the reaction includes a chain transfer agent.

In still another embodiment, the adhesive composition for use in conjunction with the present invention is an acrylic emulsion polymer system comprised of a copolymer of about 15 weight percent to about 35 weight percent of vinyl acetate, about 20 weight percent to about 40 weight percent of di-2-ethylhexyl maleate, about 35 weight percent to about 60 weight percent 2-ethylhexyl acrylate and about 1 weight percent to about 3 weight percent of one or more unsaturated carboxylic acids for each 100 parts by weight of polymer, and about 3 weight percent to about 20 weight percent of acidic rosin derivative provided as tackifier and about 1 weight percent to about 10 weight percent of a rosin based surfactant (e.g., an ethoxylated rosin based surfactant) based on 100 parts of the adhesive composition. This adhesive will be referred to as AE-3339 in the Examples contained below. Such adhesive compositions are disclosed in U.S. Pat. No. 5,385,965, the disclosure of which is hereby incorporated herein in its entirety.

In still another embodiment, the adhesive composition for use in conjunction with the present invention is an acrylic emulsion polymer comprising, on a polymerized basis based on the total weight of the polymer, at least one alkyl acrylate containing from about 4 to about 8 carbon atoms in the alkyl group (e.g., 2-ethylhexyl acrylate), the alkyl acrylate being present in a total amount from about 35 weight percent to about 60 weight percent, at least one vinyl ester containing from 2 to about 16 carbon atoms in the alkyl chain of the acid, (e.g., vinyl acetate), the at least one vinyl ester being present in a total amount of from about 15 weight percent to about 35 weight percent, at one least one diester of a dicarboxylic acid wherein each alkyl group of the diester independently contains from about 6 to about 12 carbon atoms, (e.g., di-2-ethylhexyl maleate or di-2 ethylhexyl fumarate) the diester being present in a total amount form about 20 weight percent to about 40 weight percent, and up to about 5 weight percent (or even about 1 weight percent to 3 weight percent) of an unsaturated carboxylic acid that contains from 3 to 5 carbon atoms (e.g., acrylic acid and/or methacrylic acid), where the emulsion polymer has a $T_g$ of less than about −30° C. and a gel content of about 50 weight percent to about 70 weight percent of the polymer. The monomer proportions of such emulsion pressure-sensitive adhesive polymer compositions can be adjusted in such a way that the adhesive has a glass transition temperature less than about −30° C., or even less than about −34° C., yielding a good balance of adhesion and tack at room temperature and low temperatures. In one embodiment, the emulsion polymers of the present invention have a very broad glass transition temperature range. This adhesive will be referred to as AE-3349, in the Examples contained below.

In still another embodiment, the adhesive composition for use in conjunction with the present invention is an acrylic emulsion pressure-sensitive copolymer latex comprising butyl acrylate, 2-ethylhexyl acrylate and mixtures thereof with an unsaturated carboxylic acid (e.g., methacrylic acid) that is stabilized via nonylphenol polyethylene glycol and partially hydrolyzed polyvinyl alcohol, having a mean particle size greater than about 1 micron and a particle size range of about 0.5 microns to about 3.0 microns, having a glass transition temperature ("$T_g$") value of about −48° C. to about −55° C. This adhesive will be referred to as AE-5044 in the Examples contained below.

In still another embodiment, the adhesive composition for use in conjunction with the present invention is a homogeneous dispersion comprising an anionic/non-ionic emulsion pressure-sensitive copolymer latex of 2-ethylhexyl acrylate and other alkyl acrylates (e.g., methyl acrylate, methyl methacrylate, and mixtures thereof) and styrene with at least one unsaturated carboxylic acid, including tackifiers comprising a mixture of hydrogenated rosin and tall oil esters. This adhesive will be referred to as DEV-5176LO in the Examples contained below.

In still another embodiment, the adhesive composition for use in conjunction with the present invention is an acrylic emulsion polymer comprising at least one acrylate ester of an alcohol containing at least four carbon atoms, at least one partially water soluble comonomer and at least one polar comonomer. The polymers are formed in the presence of a mixture of nonionic and anionic surfactants and a mean particle size of less than about 0.200 microns and a particle size range of about 0.15 microns to about 0.25 microns. Suitable alkyl acrylates include, but are not limited to, butyl acrylate, 2-EHA and mixtures thereof. Suitable partially water soluble comonomers include, but are not limited to, methyl acrylate, methyl methacrylate and mixtures thereof. In one instance, acrylic acid is the polar comonomer and is utilized with another carboxylic acid such as methacrylic acid. This adhesive will be referred to as AE-3413CC in the Examples contained below.

In still another embodiment, the adhesive composition for use in conjunction with the present invention is a polymer produced by copolymerizing a plurality of monomers in a solution using a mixture of hexane and toluene whose ratio is adjusted to provide a reflux temperature between about 77° C. and about 84° C. The solids content during polymerization is typically range from about 50 percent to about 60 percent in order to achieve the desired weight average molecular weight and yet achieve viscosities that a manageable in the reactor. The copolymer is prepared by copolymerizing a mixture of monomers comprising at least one monomer selected from alkyl acrylate esters containing from about 4 to about 12 carbon atoms in the alkyl group with such one or more alkyl acrylates present in a total amount from about 90 weight percent to about 98 weight percent with up to about 5 weight percent (e.g., about 1 weight percent to about 3 weight percent) of an unsaturated polar acrylate monomer that contains from 3 to 5 carbon atoms and in one instance at least one hydroxyl group. Such polymers can, as desired, be post-polymerized crosslinked using heat, catalysts, or actinic radiation. The adhesive properties of such compounds can be further manipulated and modified by additions of additives such as tackifiers, plasticizers, etc. This adhesive will be referred to as AS-8168PE in the Examples contained below.

In still another embodiment, the adhesive composition for use in conjunction with the present invention is a polymer product of the copolymerization of a plurality of monomers in a solution using a mixture of hexane and toluene whose ratio is adjusted to provide a reflux temperature between about 70° C. and about 84° C. The solids content during polymerization may typically range from about 30 percent to about 75 percent in order to achieve the desired weight average molecular weight and yet achieve viscosities that a manageable in the reactor. The copolymer is prepared by copolymerizing a mixture of monomers comprising at least one monomer selected from the group of alkyl acrylate esters containing from about 4 to about 12 carbon atoms in the alkyl group where such one or more alkyl acrylate esters are present in a total amount from about 65 weight percent to about 80 weight percent with at least one vinyl ester containing from 2 to about 16 carbon atoms in the alkyl chain of the acid (e.g., vinyl acetate), with such said vinyl acetate present in a total amount of from about 15 to about 35 percent by weight, and up to about 5 weight percent by weight, (or even about 1 to 3 percent), of an unsaturated carboxylic acid contains from 3 to 5 carbon atoms (e.g., acrylic acid and/or methacrylic acid). These polymers can, if so desired, be post-polymerized crosslinked using heat, catalysts, or actinic radiation. The adhesive properties can be further manipulated and modified by additions of additives such as tackifiers, plasticizers, etc. This adhesive will be referred to as AS-8045 in the Examples contained below.

In one embodiment, the adhesive composition for use in conjunction with the present invention is selected based on the ability of a caustic wash (e.g., a caustic wash utilizing NaOH) to dissolve, dissociate, or cause the adhesive composition to release from an underlying polymer, or plastic, surface without the need for further processing steps to render the underlying polymer, or plastic, packaging article suitable for a recycling process. The adhesive can come from the group of solvent adhesives, emulsion adhesives, cold stick adhesives, radiation curable adhesives, and hot melt adhesives or any combination or layer combination of the above. It is important to remove as much, or even all, of the adhesive composition from the surface of the polymer, or plastic, packaging article as the presence of an adhesive composition contamination in a typical recycle process for PET, for example, can cause color change haze shift and inconsistent recycled product. Additionally, due in part to the present invention's choice of adhesive, the amount of the overall label material, the label's adhesive material, and/or the label's facestock material left on the recycled article is substantially reduced and/or eliminated. As is known to those of skill in the art, contamination of a PET recycle stream by label material, or facestock material can cause failure in the recycle process to occur due to a variety of reasons (e.g., excessive haze or discoloration, char, fiber/contaminates, dirt count, etc.). One method by which to evaluate labels and/or facestock material for compatibility with PET recycling is "Protocol for Evaluating Pet Thermoform Labels and Adhesives for Compatibility with PET Recycling," Feb. 8, 2011 document, Association of Postconsumer Plastic Recyclers (www.plasticsrecycling.org), the complete disclosure of which is hereby incorporated herein in its entirety by reference.

It should be understood that the present invention is not limited to any one caustic wash process. Thus, any suitable caustic wash process can be utilized in conjunction with the present invention. Such caustic washes include, but are not limited to, NaOH, KOH, LiOH, MgOH, CaOH, or suitable mixtures of two or more thereof. It can also contain other agents to aid in the effectiveness of the caustic solution such as Triton X-100. Triton X-100 ($C_{14}H_{22}O(C_2H_4O)_n$) is a nonionic surfactant which has a hydrophilic polyethylene oxide group (on average it has 9.5 ethylene oxide units) and a hydrocarbon lipophilic or hydrophobic group. The hydrocarbon group is a 4-(1,1,3,3-tetramethylbutyl)-phenyl group. It is related to the Pluronic range of detergents marketed by BASF. The pluronics are triblock copolymers of ethylene oxide and propylene oxide. The part formed from ethylene oxide is more hydrophilic than the part from propylene oxide. Triton X-100 is very viscous at room temperature and is thus easiest to use after being gently warmed. It should be noted that individual reclaim facilities will use a multitude of special additives and processes (such as agitation, air allutriation, mechanical separation, chemical additives, wet grinding, friction washing, pressure washes). The examples given above are a generalized process, and may vary from facility to facility in the industry.

Figure 1:
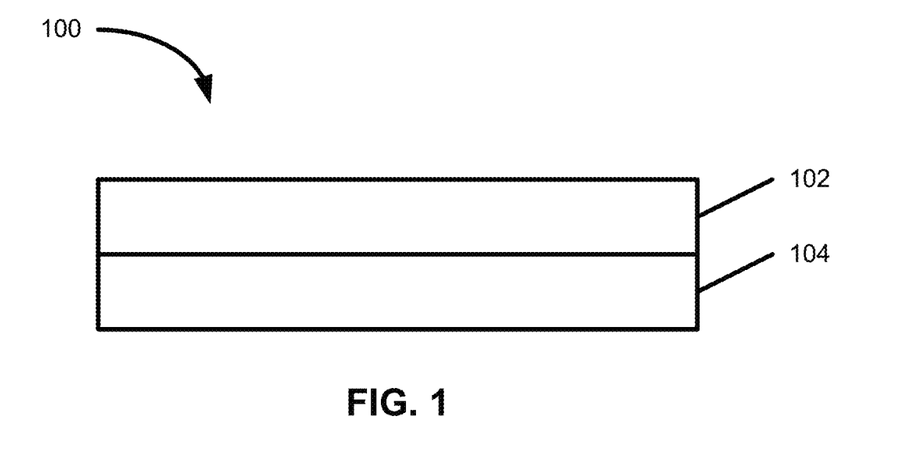
FIG. 1 is a cross-section illustration of a facestock and/or label for use on a polymer, or plastic, packaging article, or a glass article, in accordance with one embodiment of the present invention.

Turning to the Figures, FIG. 1 is a cross-section illustration of a facestock and/or label 100 for use on a polymer, or plastic, packaging article in accordance with one embodiment of the present invention. Label 100 is comprised of at least two layers, a print, or face, layer 102 and an adhesive layer 104. Adhesive layer 104 is, as discussed above, selected based on the ability of a caustic wash (e.g., a caustic wash utilizing NaOH) to dissolve, dissociate, or cause the adhesive composition to release from an underlying polymer, or plastic, surface without the need for further processing steps to render the underlying polymer, or plastic, packaging article suitable for a recycling process. It should be noted that label 100 can further include one or more layers additional non-disclosed layers or one or more additives to any layer present that either facilitate the use of a caustic wash to remove label 100 from the packaging material that is destined for recycling, or that impart a useful property or characteristic to label 100 (e.g., printability, UV-resistance, etc.). Some examples of such additional additive materials include, but are not limited to, any suitable type of surfactant (e.g., one or more nonionic surfactants, one or more ionic surfactants, one or more amphoteric surfactants, or suitable combinations thereof), polymer processing aids, UV-protectants, etc. As noted above, a suitable surfactant is Triton X-100.

One additional factor that is considered when selecting an adhesive composition for layer 104 is the pH of the adhesive material. In one embodiment, the pH of the adhesive material should be selected such that the caustic material utilized in the wash process is able to dissolve, dissociate, or cause the adhesive composition to release from an underlying polymer, or plastic, surface without the need for further processing steps to render the underlying polymer, or plastic, packaging article suitable for a recycling process. In one embodiment, the pH of the adhesive material is between about 0.1 and about 7. One advantage of selecting an adhesive with a pH in the desired range is that an adhesive having a desirable pH will aid in the speed of dissociation of the adhesive. In an acidic environment, one would select an adhesive having the reverse pH range (i.e., a pH in the range of about 7 to about 14).

One additional factor that is considered when selecting an adhesive composition for layer 104 is the composition of the adhesive. Adhesives with compositions that yield hydrophilic properties will allow for absorption of water and the caustic solution, and aid in the speed of dissociation of the adhesive.

In another embodiment, in addition to, or instead of, one can consider the hot tack property of the adhesive composition to be utilized in conjunction with the present invention. In one embodiment, an adhesive composition with a low adhesion at an elevated temperature of more than about 50° C., or more than about 55° C., or more than about 60° C., or even more than about 65° C., is utilized. The advantage of using an adhesive composition with a low adhesion, or tack, at an elevated temperature is that this facilitates the adhesive to release when the polymer, or plastic, packaging article is subjected to the initial process to remove the packaging label prior to recycling of the underlying package.

Regarding the choice of material for the face, or print, layer 102, layer 102 is selected so that the permeability, integrity and/or chemical properties thereof are selected so that the caustic material utilized to remove facestock 100 will sufficiently permeate through and/or around layer 102 so as to reach a suitable amount of the adhesive in layer 104 in order to facilitate the dissociation, or release, of layer 104 from the surface of the polymer, or plastic, packaging article in a desired amount of time. Also of consideration in the choice of layer 102 is to make sure that the choice of material utilized in layer 102 permits enough of, or all of, the adhesive composition in layer 104 to be removed from the surface of the polymer, or plastic, packaging article.

Given the above, in one embodiment layer 102 is selected so the dimensional stability in heat based on the shrinkage type, amount and direction thereof is chosen such that layer 102 shrinks when subject to heat during the caustic wash process thereby permitting additional access to the adhesive portion of a facestock in accordance with the present invention. In one embodiment, layer 102 is selected from materials that are permeable to the caustic materials utilized during a caustic wash process. For example, layer 102 can be selected from certain paper materials that allow caustic washes (NaOH, water, etc.) to penetrate there through. Alternatively, layer 102 can also be designed to dissolve, or dissociate, when exposed to a caustic wash step thereby exposing the upper surface of adhesive layer 104 for attack by the caustic and therefore removal from the surface of the polymer, or plastic, packaging article.

In one embodiment, layer 102 can be formed from any suitable polymeric or paper facestock material. Such materials include, but are not limited to, paper facestocks, olefin polymer facestocks (e.g., polyethylene facestocks, polypropylene facestocks, etc.), polystyrene facestocks, or PET facestocks. In one embodiment, where possible and/or desirable the facestocks of the present invention can be unaxially oriented, biaxially oriented, or unoriented.

In another embodiment, as would be apparent to those of skill in the art, layer 102 can be formed from two or more individual layers with the material utilized to form each layer being appropriately selected from those listed above. For example, in one such embodiment, layer 102 can contain a topcoat layer, a print layer, and any suitable number of intermediate layers (not shown) prior to being attached to the upper, or top, surface of adhesive layer 104. In another embodiment, the bottom surface of adhesive layer 104 can have a release liner attached thereto prior to placement of facestock 100 on a desired surface of a polymer, or plastic, packaging article. Suitable release liner materials include, but are not limited to, those detailed in U.S. Pat. No. 5,084,317 the disclosure of which is incorporated herein in its entirety. In another embodiment, any suitable release liner material, or construction, that is designed for use with olefin-, paper- or PET-based facestocks can be utilized in conjunction with the present invention. In still another embodiment, the release line of the present invention can be any material that is suitable for use in conjunction with the one or more adhesive materials disclosed above.

Figure 2:
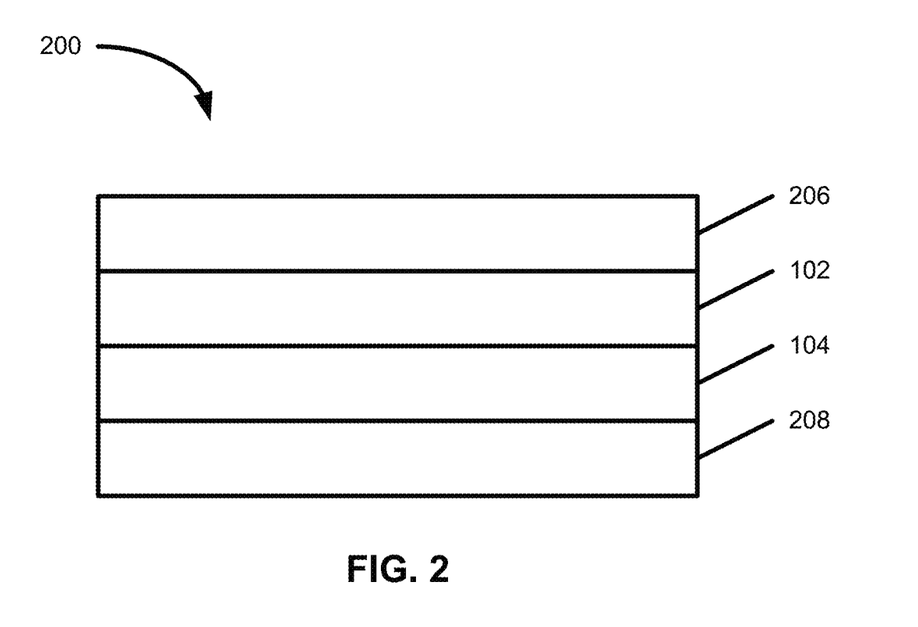
FIG. 2 is a cross-sectional illustration of a facestock and/or label for use on a polymer, or plastic, packaging article, or a glass article, in accordance with another embodiment of the present invention.

Given this, the present invention is not limited to solely the embodiments illustrated in FIG. 1. Rather, any facestock structure, or construction, can be utilized in conjunction with the present invention so long as the layers above adhesive layer 104 permit the caustic wash to penetrate there through to facilitate the dissociation, or release, of layer 104 from the surface of the polymer, or plastic, packaging article in a desired amount of time. For example, FIG. 2 is a cross-sectional illustration of a facestock and/or label for use on a polymer, or plastic, packaging article in accordance with another embodiment of the present invention. In facestock 200 of FIG. 2, facestock 200 further contains a topcoat layer 206 and a release liner 208. As would be apparent to those of skill in the art, the thickness of any layers in the facestocks of the present invention can be varied as desired depending upon a number of factors including, but not limited to, facestock construction, the intended use of the facestock, the material utilized to produce the various layers of a facestock, etc.

In still another embodiment, the bottom surface of adhesive layer 104 can have formed therein various micro-channels to permit the inflow, via capillary action, of a caustic material when the adhesive layer is placed on a surface of a polymer, or plastic, packaging article. In still yet another embodiment, the outer surface, or a portion thereof, of the polymer, or plastic, packaging article can have various micro-channels, micro-perforations, cavitation, or micro-patterns, to permit the inflow, via capillary action, of a caustic material to the underside of adhesive layer 104 when layer 104 is placed there over. In still yet another embodiment, the surface of the polymer, or plastic, packaging article can have an appropriate lack of smoothness so as to facilitate the release of the adhesive material in layer 104 from the surface of the polymer, or plastic, packaging article. In still yet another embodiment, the polymer, or plastic, packaging article can contain therein a release agent (e.g., a silicon release agent) that can be activate by the caustic wash and thereby aid in the removal of the adhesive material in layer 104 from the surface of the polymer, or plastic, packaging article.

In another embodiment, layer 102 can be selected to have dimensional shrinkage in either one of, or both of, the machine direction, or cross-sectional direction, so as to aid in exposing additional surface area of adhesive layer 104 for attack by the caustic wash.

As would be apparent to those of skill in the art, one or more of the above design factors can be considered when designing a facestock, or label, in accordance with the present invention. Also, should the facestock, or label, of the present invention possess multiple layers above the adhesive layer thereof each individual layer thereof is designed taking into consideration one or more of the above factors.

In light of the above, in one embodiment the present invention makes possible the removal of a facestock, or label from the surface of a polymer, or plastic, packaging article via the use of a single caustic wash step.

Various examples within the scope of the present invention will be discussed in detail below. It should be noted that the scope of the present invention is not to be construed as limited by the nature of the examples discussed below. Rather, the scope of the present invention should be broadly construed in light of all of the various embodiments detailed herein.

Facestock/Adhesive Combination Examples:
(1) Direct Thermal DT200HD Paper Facestock with AE-3339 Adhesive;
(2) 54# Semi Gloss (SG) Paper Facestock with AE-3339 Adhesive;
(3) Direct Thermal DT200HD Paper Facestock with AE-3349 Adhesive;
(4) 2.6 mil White Biaxially Oriented Polypropylene (BOPP) Film Facestock with AE-3349 Adhesive;
(5) 60# Cast Gloss Paper Facestock with AE-3349 Adhesive;
(6) Direct Thermal DT200HD Paper Facestock with DEV-5176LO Adhesive;
(7) 2.0 mil Clear Biaxially Oriented Polypropylene (BOPP) Film Facestock with AE-3413CC Adhesive;

(8) 54# Semi Gloss (SG) Paper Facestock with AE-5044 Adhesive;
(9) Direct Thermal DT200HD Paper Facestock with AE-5044 Adhesive;
(10) 2.3 mil White Biaxially Oriented Polypropylene (BOPP) with AE-3339 Adhesive;
(11) Printed Facestock with Thermal Transfer Printing Direct Thermal DT200HD Paper Facestock with AE-3349 Adhesive;
(12) 2.6 mil White Biaxially Oriented Polypropylene (BOPP) Film Facestock with AE-3339 Adhesive;
(13) Avery Dennison Crystal Fasclear with AE-3413CC Adhesive;
(14) 2.0 mil Clear Biaxially Oriented Polypropylene (BOPP) with AS-8168PE Adhesive;
(15) 2.0 mil Clear Biaxially Oriented Polypropylene (BOPP) with AS-8045 Adhesive;
(16) 2.3 mil White Biaxially Oriented Polypropylene (BOPP) with AS-8168PE Adhesive;
(17) 2.3 mil White Biaxially Oriented Polypropylene (BOPP) with AS-8045 Adhesive;
(18) 2.0 mil Clear Biaxially Oriented Polypropylene (BOPP) with AS-8045 Adhesive; and
(19) 2.0 mil Clear Biaxially Oriented Polypropylene (BOPP) with DEV-5176LO Adhesive.

Table 1 below details various data and observations with regard to Examples (1) through (11) listed above.

The caustic solution for use in the above examples is a 3 gallon solution of 0.1 percent NaOH that is formed from mixing 125 grams NaOH pellets with 12,376 grams of water in 5 gallon pail by adding the water in twelve 1000 gram increments and then adding the last 376 grams of water. A surfactant is then added at a concentration 0.3 percent by volume by adding 35.27 mL of Triton X-100 to 100 grams of water and then adding the resulting mixture to the 0.1 percent solution of NaOH in the 5 gallon pail. The resulting mixture is then gently stirred with a steel rod (mixing blade) to ensure that the Triton X-100 is thoroughly dispersed in the solution.

way as PET does in a hot caustic bath. PET shows significant loss in area (42.25 percent) while PS shows very little (1.04 percent). It is also noted that PET curls more when exposed to heat versus PS (which only shows very slight curl—see FIG. 3). The change in exposed surface area seen in the PET sample contributes to the ability of the caustic to reach the interface between the substrate and adhesive in the label construction.

Experimental Procedure:

First, PET and PS containers are cut into suitably sized squares for observation using 2×2 inch dies. The samples used are taken out of the flat section on the lid of a suitable container. Next, caustic is then placed in 100 mL beakers and heated on a hot plate under ambient conditions until it reached 85° C. The samples are then placed on office store binder clips and hung across a stainless steel rod. The samples are then submerged in the caustic wash solution for 15 minutes. The samples are removed from the caustic solution and are rinsed with water to remove any residual solution. The samples are measured using a ruler to the nearest 1/32 of an inch. The data is collected and shown below in Table 2.

TABLE 2

| PET (inches) | PS (inches) |
| --- | --- |
| 1.3125 × 1.8125 | 2 × 2 |
| 1.3125 × 1.75 | 2 × 1.96875 |
| 1.3125 × 1.71875 | 2 × 1.96875 |

The area of each sample is calculated by multiplying the base by the height of the sample. Measurements are taken from material after it is uncurled and an average of all three samples is taken (see Table 3). See FIG. 3 for a visual of the curl.

TABLE 1

| Example No. | Description | Wash Observations | Washed Flake Db‡ | 3 mm Plaque L‡ | 3 mm Plaque Db‡ | 3 mm Plaque DHaze | Specks DFailed | Fluorescence |
| --- | --- | --- | --- | --- | --- | --- | --- | --- |
|  | Criteria | Label Float/Dissolve | <3 | >82 | <3 | <10% | >0.015" | <Control |
| 1 | DT200HD/AE-3339 | Dissolved | 0.34 | 89.7 | −0.49 | 4.3 | 3 | None |
| 2 | 54# SG/AE-3339 | Dissolved | 0.21 | 89.8 | −0.46 | 5.4 | 21 | None |
| 3 | DT200HD/AE-3349 | Dissolved | 0.29 | 88.2 | −0.01 | 9.1 | 4 | None |
| 4 | 2.6 Mil White BOPP/AE-3349 | Float | −1 | −1.3 | 2 | 3 | 2 | None |
| 5 | 60# Cast Gloss/AE-3349 | Dissolved | 0.77 | −0.2 | 0.35 | 2.8 | −3 | None |
| 6 | DT200 HD/DEV-5176L0 | Dissolved | −0.19 | −0.3 | 0.48 | 2.6 | −3 | None |
| 7 | 2.0 Clear BOPP/AE-3413CC | Float | 0.01 | 0.1 | −0.08 | 0 | −1 | None |
| 8 | 54# SG/AE-5044 | Dissolved | 0.48 | 0 | −0.24 | 2.6 | −1 | None |
| 9 | DT200HD/AE-5044 | Dissolved | 0.38 | −2.3 | 0.23 | 15.6 | −1 | None |
| 10 | 2.3 White BOPP/AE-3339 | Float | 1.8 | 0.2 | −0.34 | 1.8 | −2 | None |
| 11 | DT200HD/AE-3349 with TT print | Dissolved | 3.9 | −1.2 | 0.78 | 9.7 | 1 | None |

The above samples are tested following the test procedure outlined as Protocol for Evaluating PET Thermoform Labels and Adhesives for Compatibility with PET Recycling approved Feb. 8, 2011 by the APR (Association of Postconsumer Plastic Recyclers)

Next, it is determined if polystyrene (PS) and polyethylene terephthalate (PET) show a difference in shrink properties when exposed to a caustic solution in the conditions used in a caustic wash process. As will be discussed below, it is determined that PS does not physically change the same

TABLE 3

| PETE (inches$^2$) | PS (inches$^2$) |
| --- | --- |
| 2.3773 | 4.0000 |
| 2.2969 | 3.9375 |
| 2.2558 | 3.9375 |
| Average - 2.3100 | Average - 3.9583 |

The original size of all samples is 4 square inches. The change in area is taken as a percentage by dividing the original size minus the sample average value by the original size of the sample and is 42.25 percent for PET and 1.04 percent for PS.

Figure 3:
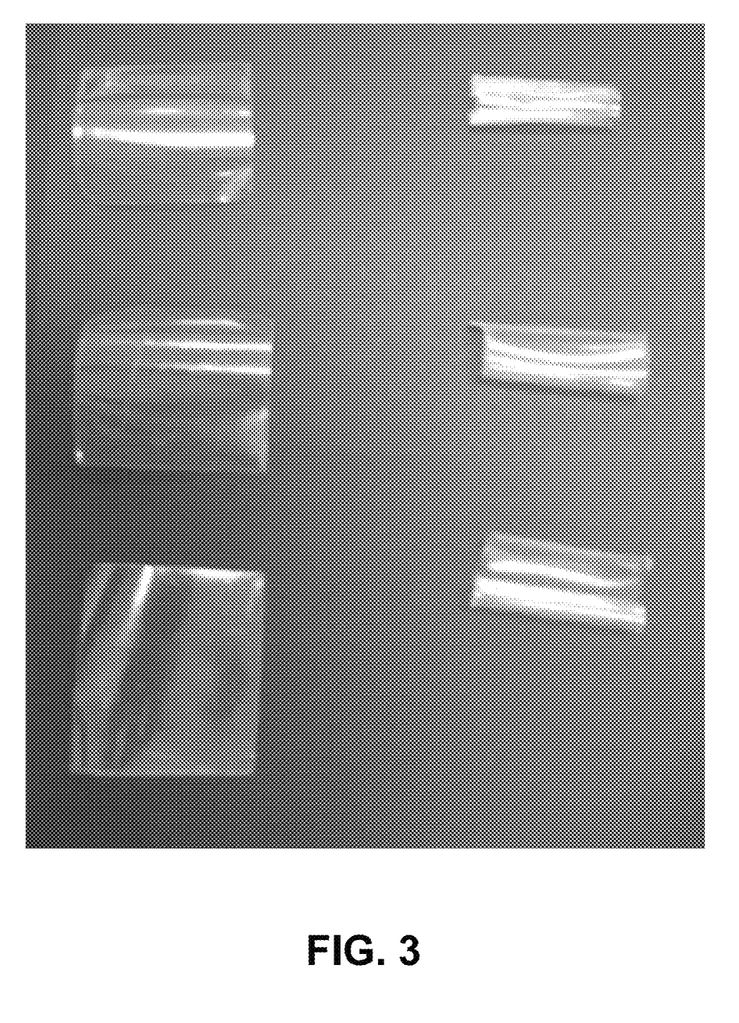
FIG. 3 is a photograph illustrating that PET curls more when exposed to heat versus PS.

As illustrated in FIG. 3, the samples in the left column are the PS samples and the samples in the right column are the PET samples. Note the amount of curl in the PET as well as the change in area. Given the above data, the PET and PS exhibited significantly different shrink when exposed to caustic. This contributes to how much surface area is exposed between the adhesive and substrate interface during the recycling process. Thus the rate and amount the PET is shrinking has an effect on what materials work on this substrate. The PET also showed more curl than the PS which may also contribute to the success of a label and an adhesive with this combination.

The following are items are used during the testing of the above examples. OakTon Stable Temp with caustic solution at 85° C.; DEK-TRON Scientific Instruments DCS-205CTB Constant Temperature Bath Shrink Tension device; Fischer Instruments IsoTemp 210 with caustic solution; MTS 500/S Instron Device; PET Panels (part STND 198418) from Sabic Polymer Shapes; PET Thermoforms from ParPack (shipped from NAPCOR (National Association of PET Container Resources)) compliant with APR protocol. The following products are examined: (a) polyethylene (PE) 85 with AE-3413CC adhesive; (b) polyethylene (PE) 85 with AE-3349 adhesive; (c) polyethylene (PE) with AE-3339 adhesive; (d) white Biaxially Oriented Polypropylene (BOPP) with AE-3339 adhesive; (e) white Biaxially Oriented Polypropylene (BOPP) with AE-3349 adhesive; (f) clear Biaxially Oriented Polypropylene (BOPP) with AE-3413CC adhesive; (g) clear Biaxially Oriented Polypropylene (BOPP) with AE-3339 adhesive; (h) GCX NTC*B Clear Film; (i) GCX NTC*B White Film; (j) GCX NPS*B Clear Film; and (k) GCX NPS*B White Film.

The caustic solution for use in these examples is a 3 gallon solution of 0.1 percent NaOH that is formed from mixing 125 grams NaOH pellets with 12,376 grams of water in 5 gallon pail by adding the water in twelve 1000 gram increments and then adding the last 376 grams of water. A surfactant is then added at a concentration 0.3 percent by volume by adding 35.27 mL of Triton X-100 to 100 grams of water and then adding the resulting mixture to the 0.1 percent solution of NaOH in the 5 gallon pail. The resulting mixture is then gently stirred with a steel rod (mixing blade) to ensure that the Triton X-100 is thoroughly dispersed in the solution.

Next, 2×4 inch labels are coated and die cut on the pilot coater and Mark Andy press respectively. The labels are hand applied to the substrate and rolled with a 4 pound roller. Clamps are placed onto each 2×6 inch panels (5 reps) then placed onto a SS rod for support. The rod is then placed over the opening of a bath of the caustic solution detailed above at 85° C. for a 6 minute dwell time. Observations are made at the end of the 6 minutes, and samples (if they did not fully remove from the substrate) are taken to an Instron tester and a 180 peel adhesion is performed to obtain the force of the adhesive to remove it from the substrate. The force necessary to peel the various labels from their substrates are detailed in FIG. 4 (note—the substrate on the 180 peels is PE 85 on AD-3413CC and White BOPP on AE-3349).

Then, samples of the film are taken to a DEK-TRON DCS-205CTB device and the shrink tension (in MD and CD) of the film is measured. The resultant forces of the adhesive are then compared to that of the film.

Figure 5:
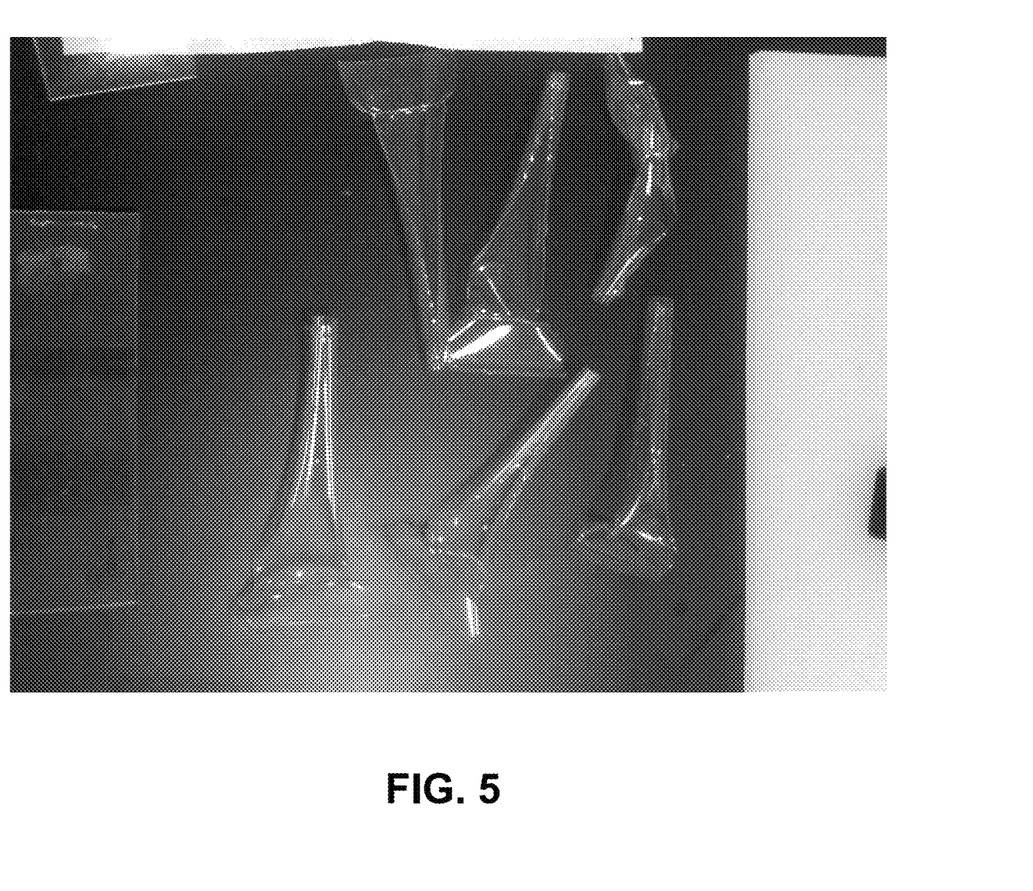
FIG. 5 is a photograph illustrating PET thermoforms that have curled and shrunk.

Samples of the PE 85/AE-3339 PE 85/AE-3413CC, PE 85/AE-3339 Clear BOPP/AE-3339, GCX NPS*B/AE-3339, Clear BOPP/AE-3413CC, and White BOPP/AE-3349 are placed on PET thermoforms and placed in the caustic solution at 85° C. After 4 minutes most samples are floating in the caustic solution and have detached from the substrate. The PE 85 film is from Nordenia (located in Jackson, Miss.) and is an unoriented blown PE film. As noted above, the PE 85 film is not an oriented film orientation in at least one direction and still yields facestock constructs in accordance with the present invention that overcome the adhesive retention force. This is a significant and unexpected result. It is noted after this first test that the samples of PET thermoform have curled and shrink (see FIG. 5).

Based on the above result, it was theorized that the substrate (PET thermoform) was curling and shrinking, which was the mechanism of removal, not the film shrink force. At this point ⅛ inch PET panels are used and the test is repeated. When the PET panes are used, most of the film and adhesive combinations from above did not remove after 6 minutes at 85° C. in a caustic bath. The PET panels themselves do bend slightly but do not shrink and curl as violently as the above PET thermoforms do. The samples that removed are those of AE-3339 that has a rosin based surfactant component with an unique cloud point such that it is a waxy solid at room temp but liquefies at 110° F. When the label is immersed in warm water the rosin soap liquefies and deadens the label at the adhesive/bottle interface.

The samples are then taken to perform a 180° peel adhesion and separate samples of the film are taken to obtain the shrink force and shrink tension of the films. As can be seen from the graph of FIG. 4, the shrink force of the films is clearly much lower than the adhesive peel force. In this case, the film shrink force is not overcoming the adhesive retention force as is stated in U.S. Pat. No. 6,680,097. While not wishing to be bound to any one theory, it is believed that the PET articles are the driving forces that overcome the adhesive force.

In the case of adhesive AE-3349 at 2.91 pounds of force, the force of the PET Thermoform MD+PET Thermoform CD+Film is required (1.934+0.859+0.073=2.9). However, as can be seen, the thermoform is approximately 97 percent of the force required to overcome the adhesive. One would naturally conclude the mechanism is largely dependent on the PET article, and not that of the film face, due to the very small contribution of force the face exerts.

The results of the films with the adhesives being placed on PET Thermoforms and removed within 6 minutes at 85° C. in a caustic bath show that, when using a blown PE 85 film that is unoriented, that film orientation in at least one direction is not a critical mechanism to label removal as previously believed. This is a significant and unexpected finding.

To decouple the substrate and film face interaction, a substrate that is thick enough to not shrink and curl is needed. A ⅛ inch PET Panel (obtained from Sabic Polymer shapes. Part Number STND198418I) is used for peel testing. The samples are then reapplied to the PET Panel and tested in the caustic solution. At this time it is noted the PE Panel does not shrink and/or curl as much as the thermoform and that the labels do not operationally detach as they did previously. The only exception is the AE-3339 adhesive samples. This adhesive is designed to detackify at temperatures around 110° F. This observation holds true and is independent of the film shrink tension acting on the adhesive as PE 85 removes with this adhesive successfully.

At this point the labels with the adhesive are subjected to the caustic solution for 6 minutes at 85° C. and then the 180° peel adhesion is tested to discover the force of the adhesive after caustic exposure. Then, several films are tested (with and without adhesive) in caustic bath and the shrink tension of the film is tested from start to finish (6 minutes total time).

Figure 4:
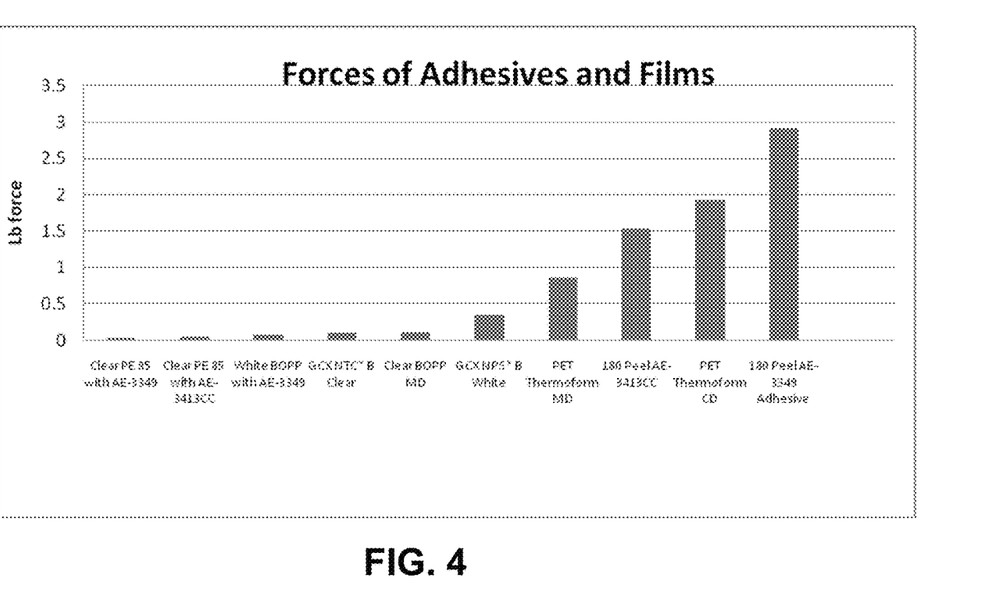
FIG. 4 is a graph illustrating the various forces of adhesives and films.

The results are tabulated and graphed as FIG. 4. From the results contained in FIG. 4 it is clear that the shrink tension of the films is far less than that of the adhesive peel force. This leads to the conclusion that the mechanism previously described is technically erroneous as the previous theory would contend that the shrink force of the film would have to be higher (and in excess) of the adhesive force to operationally detach the label.

Again, given the curl and/or shrink of the thermoforms and the data of FIG. 4, it becomes clear that the PET articles are the driving force to overcome the adhesive not the film face.

The test used to determine the 180° peel adhesion force from a known surface substrate under varied conditions (i.e., dwell times, environments, etc.) Typically, the 180° peel test is used for film face laminates; however, film face laminates with a removable adhesive should be tested at 90° (see 90° Peel Adhesion (Sintech) SOP 06.04.183).

The peel force necessary to remove an adhesive coated sample in a 180° direction after being applied using a defined pressure at a known speed to a known substrate with a specific dwell time. Units are in pounds per inch width of sample. Crosshead speed is set to 12 inches per minute via the test method.

The test equipment is as follows: Sintech constant rate of elongation tensile tester model 500/S1 or 1/G1; the testing substrate that the sample is applied to is cleaned according to ARC Test Method for panel cleaning (TM115 & TM 116); Kimwipes; heptane; acetone; isopropyl alcohol; and 1×8 inch die cut samples cut in the machine direction.

Detailed Test Method Steps—Pull back release liner of the 1×8 inch sample exposing approximately 4 inches of adhesive and apply lengthwise to a clean test panel. Next, put on the roll-down machine and roll down once up and back. Allow the sample to dwell according to specified individual requirements; i.e. 15 minutes+/−1 minute, 24 hours, etc. Then, set the gap between upper and lower jaw to accommodate sample (upper jaw must be 1 inch above the substrate to avoid pinch point hazard). Next, click the start button (on Sintechs 1 and 4 one needs to click on the motor reset at the bottom right of the screen). Then, click on the sample box and enter sample ID and ECR number or other information for identification and click okay. Next, place the bottom of substrate in lower jaw, close jaw, bring back the free end of the test specimen and insert it in the upper jaw. Make sure that both jaws are properly aligned (the upper jaw must be 1 inch above substrate to avoid pinch point hazard). Close the jaw.

Then, click on run. The crosshead will automatically go up to the highest point until the sample is peeled off the substrate or the facestock tears. The Sintech will automatically go back down to the starting point. Next, a box will appear and one enters the failure mode and clicks okay and then file. This stores the results in the directory. Click print and then okay for test results. The Sintech will automatically go back down to the starting point. Repeat steps starting with placing the bottom of the substrate in the lower jaw through the step immediately about until all samples are tested.

Record of Mode Failure—CL=Clean—the sample is cleanly removed (as observed visually) leaving no adhesive residue on panel. SP=Split—the adhesive film split during the test leaving a complete film on both the panel and the facestock. This observation indicates cohesive failure. TR=Transfer—the adhesive separates cleanly (as observed visually) from the facestock during the test, leaving a film of adhesive on the panel. This observation indicates adhesion anchorage failure from the facestock. M=Mixed—the adhesive is cleanly removed in random patches from both the facestock and test panel so that patches of adhesive on one surface are opposite clean spots on the other, in addition to cohesively split spots. The combined modes of failure are recorded in approximate percentage ratio. ST=Stain—the adhesive is removed from the panel, but leaves the panel visually discolored from the adhesive contact. JP=Jerky—peel zippy, slip-stick, or jerky peel. FT=Facestock Tear—paper or film facestock tear during the test. FP=Facestock Pluck—fibers are plucked from paper facestock. Also record any aspects of the failure which affected the test results. Examples are paper splitting, delamination, excessive facestock stretching, etc.

While in accordance with the patent statutes the best mode and certain embodiments of the invention have been set forth, the scope of the invention is not limited thereto, but rather by the scope of the attached. As such, other variants within the spirit and scope of this invention are possible and will present themselves to those skilled in the art.

What is claimed is:

1. A facestock/adhesive construction for a plastic, glass, cardboard, or metal article comprising:
   a face layer, wherein the face layer is formed from a facestock material selected from olefin polymer facestocks, polystyrene facestocks, or PET facestocks; and
   an adhesive layer,
   wherein the facestock is able to be removed from a plastic, glass, cardboard, or metal article in a manner that enables recycling of the plastic, glass, cardboard, or metal article; and
   wherein the adhesive layer comprises:
   (i) a latex comprising an acrylic emulsion pressure-sensitive copolymer comprising butyl acrylate, 2-ethylhexyl acrylate, and an unsaturated carboxylic acid; nonylphenol polyethylene glycol and partially hydrolyzed polyvinyl alcohol, the latex having a mean particle size greater than about 1 micron and a particle size range of about 0.5 microns to about 3.0 microns, and the latex having a glass transition temperature value of about −48° C. to about −55° C.

2. The facestock/adhesive construction of claim 1, wherein the olefin polymer facestocks are selected from polyethylene facestocks or polypropylene facestocks.

3. The facestock/adhesive construction of claim 1, wherein the face layer is formed from a facestock comprising two or more layers of the facestock material.

4. The facestock/adhesive construction of claim 1, wherein the facestock material of the face layer is either unaxially oriented, biaxially oriented, or unoriented.

5. The facestock/adhesive construction of claim 1, wherein the facestock material of the face layer is unoriented.

6. The facestock/adhesive construction of claim 1, wherein the carboxylic acid is methacrylic acid.

7. The facestock/adhesive construction of claim 1, wherein the facestock/adhesive construction is able to be removed by a caustic solution.

8. The facestock/adhesive construction of claim 1, wherein the facestock/adhesive construction is able to be removed by a caustic solution selected from NaOH, KOH, LiOH, Mg(OH)$_2$, Ca(OH)$_2$, or suitable mixtures of two or more thereof.

9. The facestock/adhesive construction of claim 8, wherein the caustic solution further comprises at least one surfactant.

10. The facestock/adhesive construction of claim 8, wherein the caustic solution further comprises at least one nonionic surfactant.

11. The facestock/adhesive construction of claim 1, wherein the adhesive retention force to the article is greater than the facestock shrink force in the presence of a caustic solution.

12. The construction of claim 1, wherein the acrylic emulsion pressure-sensitive copolymer consists of butyl acrylate, 2-ethylhexyl acrylate, and an unsaturated carboxylic acid.

13. A container comprising:
   the facestock/adhesive construction of claim 1 adhesively joined to an outer surface of an article; and
   wherein the article is formed from polyethylene terephthalate (PET).

14. A method of removing the facestock/adhesive construction of claim 1, wherein the method comprises the steps of:
   (a) supplying at least one article to be later recycled, the article having attached thereto at least one facestock/adhesive construction according to claim 1; and
   (b) subjecting the article containing the at least one facestock/adhesive construction to at least one caustic solution until the facestock/adhesive construction releases from the article to be recycled,
   wherein the at least one article is plastic, glass, cardboard, or metal.

15. The method of claim 14, wherein the method further comprises the steps of:
   (c) separating the removed one or more facestock/adhesive construction from the article to be recycled; and
   (d) optionally washing the article to be recycled to remove any remaining caustic solution prior to further recycling steps.

16. A container comprising:
   a facestock/adhesive construction comprising a face layer, wherein the face layer is formed from a facestock material selected from olefin polymer facestocks, polystyrene facestocks, or PET facestocks; and
   an adhesive layer,
   wherein the construction is adhered to the container through the adhesive layer,
   wherein the facestock is able to be removed from the container in a manner that enables recycling of the container;
   wherein the adhesive layer comprises:
      (i) a latex comprising an acrylic emulsion pressure-sensitive copolymer comprising butyl acrylate, 2-ethylhexyl acrylate, and an unsaturated carboxylic acid; nonylphenol polyethylene glycol and partially hydrolyzed polyvinyl alcohol, the latex having a mean particle size greater than about 1 micron and a particle size range of about 0.5 microns to about 3.0 microns, and the latex having a glass transition temperature value of about −48° C. to about −55° C.; and
   wherein the container is formed from polyethylene terephthalate (PET).

17. The construction of claim 16, wherein the acrylic emulsion pressure-sensitive copolymer consists of butyl acrylate, 2-ethylhexyl acrylate, and an unsaturated carboxylic acid.

* * * * *